Aug. 26, 1969     A. J. BLANC ET AL     3,463,595
FIBER OPTICS APERTURE
Filed Nov. 8, 1965
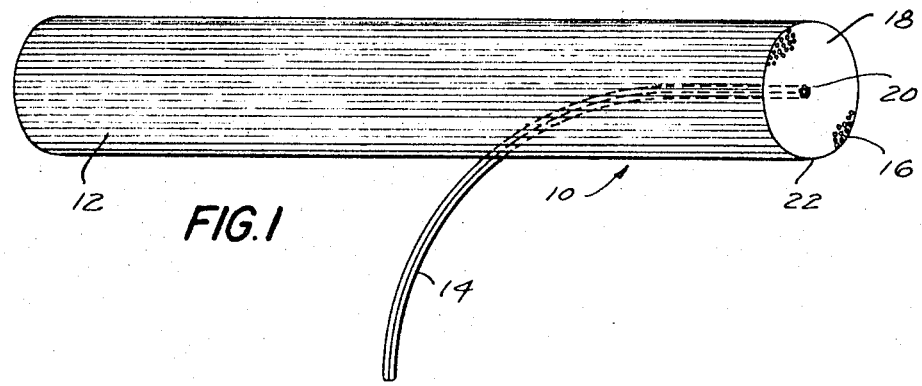
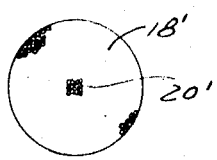
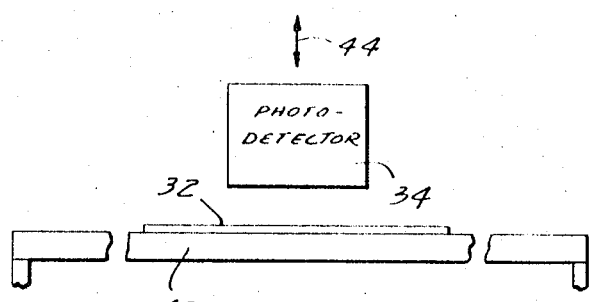
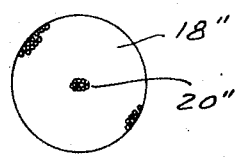
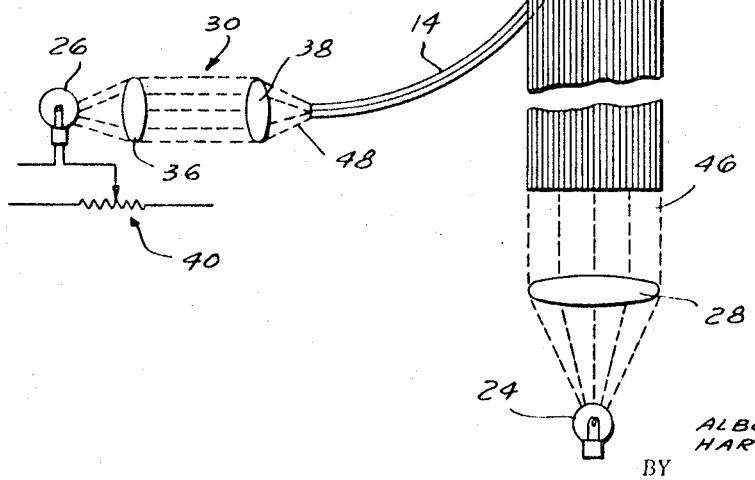
INVENTORS
ALBERT J. BLANC
HARVEY LEVINE
BY
ATTORNEYS

United States Patent Office 3,463,595
Patented Aug. 26, 1969

3,463,595
FIBER OPTICS APERTURE
Albert J. Blanc and Harvey Levine, Newburgh, N.Y., assignors to MacBeth Corporation, Newburgh, N.Y., a corporation of New York
Filed Nov. 8, 1965, Ser. No. 506,796
Int. Cl. G01n 21/06, 21/22; G02b 5/14
U.S. Cl. 356—201          1 Claim

ABSTRACT OF THE DISCLOSURE

Photometric measuring apparatus is disclosed consisting of a photodetector and a sample platform. Fiber optic light transmitting elements consisting of a relatively large bundle of fiber optic rods are utilized for illuminating the total area of a sample placed on the platform from a distinct light source. The large bundle surrounds a relatively small bundle of fiber optic rods illuminated from a second light source. The small bundle of rods defines the evaluation area of the sample and thus becomes a "fiber optics aperture." Differential illuminating light intensity between the total area and evaluation area provides easy manipulation of the sample over the platform in order to select desired portions thereof to be placed over the evaluation area. During transmittance measurements over the evaluation area, the light source supplying the large bundle is then extinguished.

---

The following invention relates to an optical system. More specifically the invention relates to a bifurcated fiber-optics rod assembly defining a combined viewing area and an aperture area adapted for use with an optical system for making photometric measurements of a sample.

In the past, it has generally been the practice in photometry to employ an opaque disc with an aperture provided therein and a light source, together with a system of lenses to effectively focus a beam of light on the aperture. The size and shape of the aperture determines the size and shape of the light beam passing therethrough. This light beam, which passes through the aperture, falls upon and passes through a sample placed in the beam path, and a photodetector, also placed in the beam path, responds to the attenuated light that strikes a light sensitive face. Broadly, the difference in detector response to attenuated and unattenuated light defines the transmittance or density of the sample.

While this method of making photometric measurements has gained general acceptance throughout the in dustry, it is not free of deficiencies when photometrically measuring properties of sample portions which are relatively larger than the aperture. One classic problem arises when the sample portion to be tested is only slightly larger than the aperture in the opaque disc. Thus, when taking measurements of a sample portion that is only slightly larger than the aperture area, it is extremely difficult to accurately locate the exact sample area within the light beam through the aperture and within the beam path to the photodetector. This difficulty arises due to the fact that the surface surrounding the aperture does not transmit light and, therefore, most of the sample area is obscured.

It is well-known that all light, excepting that which passes through the aperture, must be excluded from the light sensitive device in order to obtain a proper reading. Therefore, it would be inappropriate and, in fact, undesirable to form the surface bounding the aperture of a light transparent material, for while more of the sample portion would be illuminated, properly to locate such portion over the aperture, the material would pass light and thereby introduce an uncorrectable reading error.

To overcome this classic problem in photometry the invention coutemplates the implementation of a multiplicity of fiber-optics rods, all of which are capable of passing light from one point to another. The total mass of rods is bifurcated to form a plurality of separate bundles, each separate bundle to be used in conjunction with a source of illumination together with an optical lens system. Thus, the lenses focus or collimate the light from the source on one end of each bundle for optical conduction of the light to the other end. At the other end, the mass defines two distinct areas. Therefore, the invention defines an optical system which includes a light passing aperture formed by one bundle, surrounded by a second bundle, which is illuminated during alignment of a sample area over the aperture yet during photometric measurements of the sample is extinguished whereby the second bundle is opaque. In other words, while one light source is provided to properly align a sample, this light will be extinguished during a photodetector reading which is obtained solely by means of the light through the aperture.

The use of fiber-optics rods is well-known, as is the theory of their light transmitting capability. Generally, the basic theory of operation is based upon two essential principles: (1) that smooth filaments or fibers of a transparent material, such as glass, efficiently conduct light from one location to another by a series of internal reflections along their walls and (2) the individual fibers in a cluster or bundle conduct this light irrespective of and independently of the light conduction through adjacent filaments or fibers. Such principles come to play in this invention whereby the separate bundles of the bifurcated rod individually pass light from one source only.

Suitably, it is an object of this invention to provide a bifurcated fiber-optics rod defining an aperture at one end and by means of such rod, carry out a photometric measurement of an object sample whose area under determination is only slightly larger than the size of the aperture.

Other objects and advantages of this invention will become self-evident as the following description is developed.

In a broad sense, the invention is directed to an optical apparatus for making photometric measurements of a sample whose optical transmittance or density is to be measured. The apparatus comprises a multiplicity of generally similar fiber-optics rods, one end of which are joined and having a plurality of determinable areas therein, each capable of being separately illuminated. The opposite ends of the rods defining said areas are separated into a plurality of bundles of substantially dissimilar cross-section. The other end of each bundle is adapted to be illuminated by an individual light source and have means at said other ends to gather the light. Such gathered light is thereby conducted through the rods whereby a photometric measurement of a sample adjacent one area may be accomplished.

In the drawing which both illustrates and forms a part of this application,

FIGURE 1 is a perspective view of the bifurcated fiber-optics rod with several rods being hidden for the sake of clarity;

FIGURE 2 is a side elevational view of the bifurcated rod, the light sources, optical system, sample and light sensitive means;

FIGURE 3 is an end view of the fiber-optics rod, showing a modified aperture; and FIGURE 4 is an end view of the fiber-optics rod, showing an additional modified aperture.

Referring now to the drawings and particularly to FIG. 1, the bifurcated fiber-optics rod is shown and generally denoted by the numeral 10. The rod includes separate and distinct bundles 12 and 14 each of which comprises a plurality of individual filaments or fibers 16. The bundles, as previously brought out, are capable of passing light from different light sources and further conducting this light independently of adjacent fibers. Therefore, the bundles 12 and 14 effectively illuminate the areas 18 and 20 at one end of the rod.

Reference has already been made to the basic principles of operation of the fibers and while the invention is not concerned with these scientific principles a few words need to be said about the individual fibers per se. While the drawing does not show a cross-section of a single fiber (such being well-known and outside the scope of this invention) it should be stated that all fibers are optically insulated (a glass sheath of different index of refraction) to provide for total internal reflection and the substantial elimination of leakage of light from one fiber to the next—a phenomena called "optical crosstalk." For additional information, reference may be had to any one of the several technical disclosures relating to fiber-optics, such as "Fiber-Optics: Principles, Properties and Design Consideration," by Walter P. Siegmund, American Optical Company, Southbridge, Mass., a paper presented at the Sixth Annual Meeting of the Avionics Panel, AGARD (NATO) at Paris, France, in July 1962.

The individual fibers of the rod 10 are formed at one end into a homogeneous cylinder 22, which may be on the order of, as for example, 0.50 inch in diameter. It should be clear the rod 10 could take any one of several configurations and obviously, the rod could be of other diameters. The use of a rod, as noted above, has provided good results and this diameter has been conveniently chosen in accordance with the function to be carried out.

When using a cylindrical rod, as set forth above, the inner bundle 20 may be on the order of, as for example 0.020 inch in diameter. This bundle may be of a circular configuration or take other shapes as shown in FIGS. 3 and 4. If the bundle 14 is circular, the aperture 20 will be circular with the surrounding area 18 being annular in configuration.

FIGS. 3 and 4 show end views of a rod which are idenical to the showing in FIG. 1, but the inner bundles 20' and 20" are of a square and oval configuration, respectively. The interface of the outer area and inner area is therefore of a complementary configuration. The outer areas are denoted by the numerals 18' and 18". Such modified apertures may be particularly desirable in certain instances.

FIG. 2 shows the bifurcated rod of FIG. 1 in an operative position and in association with light sources 24 and 26, lens system 28 and 30, sample 32 and photodetector 34. While not shown, the rod, light sources and lens systems are provided as a unit and the photodetector is suitably housed so that stray light, or light other than that passing through the aperture, is excluded from the light sensitive face.

Lens 28 is a collimating lens which gathers the light from source 24 and directs a beam to the other end of the annular fiber-optics bundle for illuminating the area 18. The collimated beam is indicated at 46. The lens system 30 comprises a pair of lenses 36 and 38 one of which collimates the source light, the other of which focuses this light on the other end of fiber-optics bundle 14 providing a high intensity illumination of the area 20 which represents the aperture. The focused beam is indicated at 48.

Associated with light source 26 is a rheostat 40 for adjusting the intensity of the light, as is well-known. Obviously the rheostat may be associated with light source 24 or both sources may be adjustable, as desired. By means of such an adjustment, the areas 18 and 20 may be illuminated at varying intensities. The area of aperture 20 is preferably illuminated at a higher intensity than the surrounding area for precise positioning and pinpointing of the small sample.

The sample 32 is supported by a stand or platform 42 provided with a central open area so that the light beam directed to the sample will not be undesirably affected or attenuated.

The photodetector indicated schematically at 34 may be any of several light sensitive devices which are capable of providing an output proportional to the light intensity on its face to provide a reading which, as indicated above, will determine the transmittance or density of the sample under observation. As indicated by the arrow 44, the detector is vertically movable into and out of a reading position for sample positioning. During positioning of the sample the detector would be raised to allow visual positioning of the sample 32.

The operation of the device is relatively simple yet capable of producing accurate readings of samples whose area under observation is only slightly larger than the area of aperture 20. To position the sample the detector is moved upwardly and the lights 24 and 26 are turned on. The light conducted through bundles 12 and 14 falls upon the sample 32 and the area to be measured may be, by visual observation, precisely located over the aperture 20 due to the light from the aperture being of a higher intensity. Thereafter, the light source 24 is extinguished the area 18 becomes darkened and the single beam passing through aperture 20 is attenuated by the sample and the detector responds to the intensity difference which is read on a readout device, not shown. Thus, the area 18, when light 24 is extinguished, performs the function of the opaque disc in prior art devices and the only light directed to the detector is that light through the aperture. Yet the area 18 may be illuminated during positioning of the sample, as heretofore brought out.

Therefore, the invention, by means of the bifurcated rod, provides a device whereby samples having relatively small areas in relation to the aperture area can be accurately measured. Such accurate measurements were heretofore unobtainable by the use of conventional apertures.

While the invention has been particularly shown and described with reference to a preferred embodiment thereof, it will be understood by those skilled in the art that various changes in form and details may be made therein without departing from the spirit and scope of the invention.

Having described the invention what is claimed is:

1. In a photometric apparatus for the measurement of light transmittance of selected areas of a sample which are relatively small in comparison to the total area thereof, the combination comprising:
  (a) a sample platform,
  (b) a photodetector on one side of said platform,
  (c) fiber-optic light transmitting means on the other side of said platform, said fiber optic means including
    (1) a first relatively large bundle of fiber optic elements having one positioned adjacent said platform to illuminate the total area of a sample on said platform, and
    (2) a second smaller bundle of fiber optic elements surrounded by and substantially coaxial with said first bundle at said one end and defining an aperture to illuminate an evaluation area of said sample, the other ends of said bundles being separated,
  (d) differential illuminating means including (1) a first light source for illuminating the other end of said first bundle to aid in the manipulation of the sample to quickly and accurately position a selected area of the sample over said aperture and thereafter being extinguished to permit the evaluation of the light transmittance of said selected area by means of said photodetector, (2) a second light source for illuminating the other end of said second bundle, said second light source having a higher intensity than said first light source thereby providing differential illumination of said sample when said first light source is on, said second light source remaining on after said first light source is extinguished for measuring the transmittance.

References Cited

UNITED STATES PATENTS 3,315,680  4/1967  Silbertrust et al.
3,379,832  4/1968  Judin _____ 350—96 X JOHN K. CORBIN, Primary Examiner U.S. Cl. X.R.
250—227; 350—96